United States Patent Office 3,697,240

Patented Oct. 10, 1972

3,697,240

AEROSOL BOMB FILLED WITH STARTING AGENT FOR DIESEL ENGINE

Shojiro Hori, Yokosuka, and Hisao Maruta, Kashiwa, Japan, assignors to Kashiwa Asechiren Kogyo Kabushiki Kaisha, Tokyo, Japan No Drawing. Filed Nov. 24, 1970, Ser. No. 92,502
Claims priority, application Japan, Apr. 21, 1970, 45/33,488
Int. Cl. C10l *1/18*
U.S. Cl. 44—52 3 Claims

ABSTRACT OF THE DISCLOSURE

A starting agent of the aerosol-type to be jetted into a combustion chamber of a diesel engine to aid in starting the engine in a cold climate contains diethyl ether, dimethyl ether and n-butyl alcohol as main components.

BACKGROUND OF THE INVENTION

This invention relates to an aerosol bomb filled with a starting agent to be used for internal combustion engines, particularly for diesel engines difficult to start running, especially in a cold climate.

It is frequently observed that engines of automobiles, fishing boats, etc. cannot start easily when atmospheric temperature falls very low. It is known that there is a method for facilitating the starting in such cases by jetting into the combustion chamber a so-called aerosol type of starting agent which comprises highly inflammable gasoline or ether filled in a small bomb together with some jetting agent.

Generally, as the fuel for internal combustion engines, volatile fuel oil such as gasoline or gaseous fuel is used in gasoline engines, but nonvolatile fuel such as light oil or heavy oil is used in Diesel engines. Gasoline is gasified in the carburetor and then mixed with air; the mixture is introduced into the combustion chamber and ignited by electric spark to burn explosively. In Diesel engines, combustion takes place explosively when nonvolatile fuel oil is sprayed into the air which has been introduced in the combustion chamber and compressed to the state of high temperature and high pressure. An electric sparking or special igniting apparatus is sometimes used for ignition in Diesel engines of relatively small compression ratio. However, ignition is effected by the heat of compression in the case of Diesel engines of relatively large compression ratio, and this is the characteristic of Diesel engines. The compression ratio is less than 10 in most of gasoline engines, but it is 10 or more in most Diesel engines, exceeding 20 in some Diesel engines. It is well known that the gasoline engine differs from the Diesel engine in various respects of mechanical construction in addition to the above difference in the compression ratio.

Experiments for practical use were conducted by the present inventors with respect to some marketed products of aerosol bomb for starting engines. The products having good inflammability mostly contained diethyl ether as a constituent. If these products retained sufficient jettability at temperatures below about $-10°$ C., it was possible to fully expect the effect of these aerosols in engines having compression ratios of less than 10. That is to say, gasoline engines and Diesel engines of relatively small compression ratio could be started easily even at very low temperatures when these aerosols were used as starting agents, and difficulties were usually not involved which would have undesirable influences on the engines.

In the case that, for economical reason, refined petroleum products such as gasoline or kerosene, methyl alcohol, or ethyl alcohol is the main component independently or as a mixture in place of diethyl ether, the inflammability of the aerosol is not sufficient, and so the efficiency of the aerosol decreases markedly with fall of the temperature. As a result, the consumption of aerosol necessary for starting engines varies markedly depending on the change of atmospheric temperature.

Generally in the case of Diesel engines, after reaching to the lower dead point of the cylinder, the piston begins to ascend and compress the air in the cylinder, and when the piston reaches the upper dead point (the pressure and temperature in the cylinder at this moment being, for instance, about 80 atm. and 600° C. respectively), the nonvolatile fuel sprayed in the air beforehand takes fire to burn explosively, and the consequent high pressure pushes the piston down; the above processes are repeated and thus Diesel engine is operated.

If the aerosol containing diethyl ether as a main component is used for starting a Diesel engine having a compression ratio greater than 10, the following serious trouble actually occurs. When an aerosol containing as main constituent such a highly inflammable substance as diethyl ether is drawn with air into the cylinder and exposed to high pressure and temperature, the above-mentioned highly inflammable constituent takes fire and explodes before the piston reaches the upper dead point, and the extreme high pressure resulting from such explosion acts to rotate the crankshaft in the reverse direction. As a result, the engine fails to run smoothly or stops, or breaks in the worst case. These abnormal phenomena tend to take place the greater the compression ratio of the engine. Accordingly, it is not proper to use such starting agents in Diesel engines of high compression ratio.

SUMMARY OF THE INVENTION

An object of the present invention is to provide starting agents of aerosol type having none of the above-mentioned serious problems. Another object of this invention is to obtain such type starting agents having good inflammability at ordinary and low temperatures, for use in Diesel engines of medium and high compression ratio of from 10 to 25.

The above objects may be attained in accordance with the present invention by employing a mixture of diethyl ether, dimethyl ether, and n-butyl alcohol as main components of the aerosol.

DETAILED DESCRIPTION OF THE INVENTION

It is dangerous to employ ethers as starting agents in Diesel engines of high compression ratio because of excessive inflammability as described before, although said ethers are excellent in inflammability. To meet this situation, it is considered for the present to prevent the counter rotation of the crankshaft by mixing the ethers with a proper quantity of combustible substance having relatively low inflammability. It is actually possible to prevent the aforementioned counter rotation of the crankshaft by mixing the ethers with petrolic hydrocarbons having relatively high boiling point such as kerosene. However, since the aerosol of such composition becomes lower in volatility, a large amount of such aerosol must be consumed to start the engine. Consequently, it is not considered practical in view of the fact that the operation is troublesome and the economical loss becomes high.

As described above, the inflammability of conventional aerosol is in conflicted relation with its function of preventing the reverse rotation of the engine. For the purpose of eliminating this drawback, by mixing the ethers with a proper amount of n-butyl alcohol or an alcohol mixture containing n-butyl alcohol of more than 50 percent by weight on the basis of the mixture, there were obtained novel aerosols for starting Diesel engines having good inflammability and not causing the action of counter rotation in accordance with this invention. The alcohol herein mentioned generically refers to methyl-, ethyl-, allyl-, propyl-, butyl-, amyl-, hexyl-, octyl-alcohol, and their isomers.

These alcohol components, co-operating with the ether components, effectively retain the inflammability, and simultaneously reduce the excessive inflammability of the ethers. It was found out that such effect is especially great in n-butyl alcohol among the aforementioned alcohols. Accordingly, it is important that n-butyl alcohol shall take in quantity more than half of the alcohols to be mixed.

As the ether components are used dimethyl ether serving both as jetting agent and as igniting agent, and diethyl ether having good inflammability. As another igniting agent, isopropyl ether or dioxane may be used in combination. As dimethyl ether (its boiling point being −23.7° C.) has high vapor pressure at ordinary temperature, and its flash point is −41° C., this ether is specific and indispensable to the starting agent of aerosol type of the invention as a component for jetting and inflaming. When dimethyl ether is filled in an aerosol bomb, the mixing ratio is preferably from 5 to 40 percent by weight of the total filled materials. If the mixing ratio is lower than the above-mentioned range, the spraying of aerosol would become incomplete; if the mixing ratio is higher than said range, inflaming quickly takes place explosively and the engine would not run smoothly. In addition to the dimethyl ether, there is another component playing a role of principal inflaming agent among ethers having more than 3 carbon atoms, and the ether is diethyl ether having the boiling point of 34.5° C. and the flash point of −40° C. The required mixing ratio of diethyl ether is more than 50 percent by weight of total ethers in the aerosol.

It was found as the result of many experiments that the effective mixing ratio of main components of a starting agent of aerosol type according to the present invention used in Diesel engines having good inflammability and not causing the counter rotating action of the crankshaft is as follows: 20 to 60 weight parts of ethers having more than 3 carbon atoms, containing therein more than 50 weight percent diethyl ether; from 20 to 60 weight parts of alcohols containing more than 50 percent n-butyl alcohol; and from 5 to 40 weight parts of dimethyl ether, on the basis of the total mixture of 100 weight parts.

As described earlier, both diethyl and dimethyl ether have flash points of about −40° C., and are highly inflammable substances. However, there is a remarkable difference between the boiling points thereof; diethyl ether boils at 34.5° C. and dimethyl ether at −23.7° C. Consequently, if a mixture of diethyl ether and dimethyl ether is filled hermetically into an aerosol bomb, said mixture has a sufficient ability of aerosol jetting even at a temperature as low as about −20° C., because the partial vapor pressure of dimethyl ether is far greater than that of diethyl ether at ordinary and low temperatures. As dimethyl ether itself is an inflammable substance it is not necessary to be separated from diethyl ether after jetting, and the two ethers thereafter work together effectively as an igniting agent, thereby increasing the inflammability of the aerosol even more. However, the mixing of only said two compositions has counter rotating effect as described before, and so n-butyl alcohol is further added to the mixture to moderate its inflammability so as to accomplish the object of this invention which aims at developing aerosols usable in Diesel engines.

Further, it is also effective in the case of aerosols for starting Diesel engines as is the case with conventional aerosols to add and fill compressed inactive gas such as carbon dioxide or nitrous oxide to said composite so as to increase the pressure of the bomb up to from 4 to 8 atmg. at a temperature of 20° C. in order to secure the jetting of aerosol at lower temperatures. In this case as the aerosol contains a large quantity of dimethyl ether serving also as jetting agent as described before, a very small amount of compressed inactive gas is sufficient for the purpose. Consequently, the reduction of substantially effective volume of the bomb due to the addition of the compressed inactive gas is very small compared with the conventional case.

Furthermore, even if diethyl ether and n-butyl alcohol of the main components of the new aerosols are employed in mixtures respectively with other ethers and alcohols, they could be used in practice without trouble; it is because the mixed ethers and the alcohols mixed are subcomponents playing a role of extender. In view of this fact, many other combustible substances were tested as extenders, and it was found that petroleum hydrocarbons having from 3 to 17 carbon atoms can be used as the subcomponent servable as extender when the contained amount of said hydrocarbons is from 5 to 40 percent by weight on the basis of the total main components of the starting agent. Although the starting effect decreases to some extent in these cases, it is significant in that inexpensive aerosol may be supplied to the market.

The foregoing discussion covers in detail the function and effect of the low temperature starting agent according to the present invention mainly for Diesel engines of high or medium compression ratio, but it is needless to say that these aerosols may be used as starting agents in low compression ratio Diesel engines difficult to start at low temperatures depending on the quality of fuel. The aerosol according to the present invention may be also used not only in Diesel engines to be started at low temperatures, but also in that to be started at ordinary temperature depending on the quality of fuel.

DESCRIPTION OF PREFERRED EMBODIMENTS

Example 1

In a 300 cc. aerosol bomb there were filled a mixture consisting of 80 g. of diethyl ether, 40 g. of dimethyl ether, and 80 g. of n-butyl alcohol. Furthermore, 14 g. of compressed carbon dioxide gas were added to this filled mixture, and the aerosol exhibited an internal pressure of about 6 atmg. at a temperature of 20° C.

This aerosol was injected at a temperature of −20° C. for 5 seconds into the fuel suction inlet of a 4-cycle Diesel engine of direct-injection type having compression ratio of 16, and then the engine was started by fueling light oil. The engine started smoothly and did not produce any counter rotating action.

For comparison, when the aerosol of the above-mentioned composition, but not containing n-butyl alcohol, was used in the same starting test, the crankshaft of the engine was subjected to counter rotating action at starting after injecting said aerosol for 3 seconds.

Example 2

In a 300 cc. aerosol bomb there were filled a mixture consisting of 60 g. of diethyl ether, 30 g. of dimethyl ether, 20 g. of isopropyl ether, 70 g. of n-butyl alcohol, and 20 g. of methyl alcohol. Furthermore, 12 g. of compressed carbon dioxide gas was added to this filled mixture, and the aerosol exhibited an internal pressure of about 5 atmg. at a temperature of 20° C.

This aerosol was injected at a temperature of fuel suction inlet of 3 Diesel engines respectively of 2-cycle direct-injection type, 4-cycle direct-injection type, and 4-cycle precombustion type, having compression ratios respectively of 12, 16 and 22, and then each of the engines was started by fueling light oil. All engines started smoothly.

For comparison, when the aerosol of the above-mentioned composition, but using ethyl ether substituted for alcohols, was used in the same starting test, the engine having compression ratio of 12 started substantially smoothly, but the engines having compression ratio of 16 and 22 were subjected to counter rotating action on the crankshaft and stopped immediately.

Further for comparison, when the aerosol of the first composition, but using kerosene substituted for alcohols, was used in the same starting test, the engine having compression ratio of 22 started smoothly, but the engine having compression ratio 16 required 15-second injection before starting, and the engine having compression ratio of 12 failed to start even when the aerosol was injected for 20 seconds.

Example 3

Compressed carbon dioxide gas was added to an aerosol mixture consisting of 1 part (by weight, applied hereinafter) dimethyl ether, 1 part of isobutane, 4 parts of diethyl ether, and 4 parts of n-butyl alcohol, and the resultant aerosol exhibited an internal pressure of about 6 atmg. at a temperature of 20° C. This aerosol was used in the same starting test as in Example 1, and the engine started smoothly after 5-second jetting.

Example 4

Compressed carbon dioxide gas was added to an aerosol mixture consisting of 2 parts of dimethyl ether, 2 parts of diethyl ether, 4 parts of n-butyl alcohol, and 2 parts of kerosene, and the resultant aerosol exhibited an internal pressure of about 6 atmg., at a temperature of 20° C. This aerosol was used in the starting test as in Example 1, and the engine started smoothly after 5-second jetting.

What we claim is:

1. An aerosol bomb containing a starting agent for diesel engines, said agent consisting essentially of a mixture of diethyl ether, dimethyl ether, n-butyl alcohol and compressed inactive gas sufficient to provide said bomb with an internal pressure of about 4 to 8 atmg. at 20° C., said dimethyl ether constituting 5 to 40% by weight of said mixture and at least 50% by weight of all the ethers present in the mixture.

2. An aerosol bomb containing as an agent to aid in starting diesel engines in cold climate, a mixture consisting of:

(a) 20 to 60 weight parts dialkyl ether containing more than 3 carbon atoms, at least 50% of said parts being diethyl ether;

(b) 20 to 60 weight parts alcohol selected from the group consisting of methyl, ethyl, allyl, propyl, butyl, amyl, hexyl and octyl alcohols, at least 50% of said parts alcohol being n-butyl alcohol;

(c) 5 to 40 weight parts of dimethyl ether, said dimethyl ether constituting 5 to 40% by weight of the total components a, b and c and at least 50% by weight of all the ethers present in the mixture; and (d) a quantity of compressed inactive gas selected from the group consisting of carbon dioxide and nitrous oxide to provide said bomb with an internal pressure of about 4 to 8 atmg. at a temperature of 20° C.

3. An aerosol bomb containing as an agent to aid in starting diesel engines in cold climate, a mixture consisting of:

(a) 20 to 60 weight parts dialkyl ether containing more than 3 carbon atoms, at least 50% of said parts being diethyl ether;

(b) 20 to 60 weight parts alcohol selected from the group consisting of methyl, ethyl, allyl, propyl, butyl, amyl and hexyl alcohols, at least 50% of said parts alcohol being n-butyl alcohol;

(c) 50 to 40 weight parts of petroleum hydrocarbon of 3 to 17 carbon atoms;

(d) 5 to 40 weight parts of dimethyl ether, said dimethyl ether constituting 5 to 40% by weight of the total of the components a, b, c and d, and at least 50% by weight of all the ethers present in the mixture; and (e) a quantity of compressed inactive gas selected from the group consisting of carbon dioxide and nitrous oxide to provide said bomb with an internal pressure of about 4 to 8 atmg. at a temperature of 20° C.

References Cited

UNITED STATES PATENTS

| | | | |
|---|---|---|---|
| 2,948,595 | 8/1960 | Orr | 44—53 X |
| 2,365,009 | 12/1944 | Robertson | 44—53 |
| 3,361,544 | 1/1968 | Kaiser, Jr. | 44—53 X |
| 2,708,922 | 5/1955 | Neely | 44—52 X |
| 2,431,322 | 10/1947 | Goodale | 44—57 X |

OTHER REFERENCES

Kirk-Othmer, "Encycl. of Chemical Technol.," vol. 8, (1965), pp. 475–476.

DANIEL E. WYMAN, Primary Examiner

W. H. CANNON, Assistant Examiner

U.S. Cl. X.R.

44—53